United States Patent
Liu et al.

(10) Patent No.: US 9,467,962 B2
(45) Date of Patent: Oct. 11, 2016

(54) TRUSTED NON-3GPP ACCESS NETWORK ELEMENT, AND METHOD FOR ACCESSING MOBILE NETWORK AND DE-ATTACHMENT

(71) Applicant: ZTE CORPORATION, Guangdong (CN)

(72) Inventors: Guoyan Liu, Shenzhen (CN); Chunhui Zhu, Shenzhen (CN); Shuang Liang, Shenzhen (CN); Yangwei Tu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 234 days.

(21) Appl. No.: 14/345,437

(22) PCT Filed: Sep. 21, 2012

(86) PCT No.: PCT/CN2012/081716
§ 371 (c)(1),
(2) Date: Apr. 16, 2014

(87) PCT Pub. No.: WO2013/041041
PCT Pub. Date: Mar. 28, 2013

(65) Prior Publication Data
US 2014/0341203 A1 Nov. 20, 2014

(30) Foreign Application Priority Data
Sep. 23, 2011 (CN) .......................... 2011 1 0285554

(51) Int. Cl.
*H04W 60/00* (2009.01)
*H04W 12/06* (2009.01)
(Continued)

(52) U.S. Cl.
CPC .......... *H04W 60/00* (2013.01); *H04L 61/2007* (2013.01); *H04L 61/2015* (2013.01);
(Continued)

(58) Field of Classification Search
None
See application file for complete search history.

(56) References Cited

U.S. PATENT DOCUMENTS

| | | | | |
|---|---|---|---|---|
| 8,566,455 B1 * | 10/2013 | Zhao | ................... | H04W 76/025 709/227 |
| 2010/0199332 A1 * | 8/2010 | Bachmann | .......... | H04L 63/0428 726/4 |

(Continued)

FOREIGN PATENT DOCUMENTS

| | | |
|---|---|---|
| CN | 101374334 A | 2/2009 |
| CN | 101466083 A | 6/2009 |

(Continued)

OTHER PUBLICATIONS

International Search Report for PCT/CN2012/081716 dated Dec. 12, 2012.
(Continued)

*Primary Examiner* — Xavier Wong
(74) *Attorney, Agent, or Firm* — Ling Wu; Stephen Yang; Ling and Yang Intellectual Property

(57) ABSTRACT

A trusted non-3GPP access network element and a method for accessing a mobile network and detachment are disclosed. The method for accessing a mobile network includes: a TNAN network element receives an extensible authentication protocol (EAP) authentication success message or an EAP authentication success triggering message, and then establishes a session with a packet data network gateway (P-GW) of a mobile network; and the TNAN network element receives an IP address request message from user equipment and then allocates an IP address consistent with the packet data network (PDN) type requested by the user equipment to the user equipment.

20 Claims, 6 Drawing Sheets

(51) Int. Cl.
*H04L 29/12* (2006.01)
*H04L 29/06* (2006.01)
*H04W 80/10* (2009.01)

(52) U.S. Cl.
CPC ......... *H04L65/1069* (2013.01); *H04W 12/06* (2013.01); *H04L 63/0892* (2013.01); *H04L 63/162* (2013.01); *H04W 80/10* (2013.01)

(56) References Cited

U.S. PATENT DOCUMENTS

| | | | | |
|---|---|---|---|---|
| 2011/0238822 A1* | 9/2011 | Weniger | ............. | H04W 80/045 709/224 |
| 2012/0327947 A1* | 12/2012 | Cai | ................... | H04L 12/5691 370/410 |
| 2013/0290722 A1* | 10/2013 | Kall | ................... | H04L 12/4633 713/171 |
| 2014/0226668 A1* | 8/2014 | Choi | ................ | H04L 29/12301 370/392 |
| 2014/0245403 A1* | 8/2014 | Li | ........................ | H04L 12/66 726/4 |
| 2014/0341138 A1* | 11/2014 | Roeland | ............. | H04W 76/021 370/329 |

FOREIGN PATENT DOCUMENTS

| | | |
|---|---|---|
| CN | 101552723 A | 10/2009 |
| CN | 101656956 A | 2/2010 |
| CN | 101730151 A | 6/2010 |

OTHER PUBLICATIONS

Universal Mobile Telecommunications System(UMTS); LTE; Architecture enhancements for non-3GPP accesses; Jun. 2011; 3GPP TS 23.402 version 9.9.0 Release 9.

\* cited by examiner

TRUSTED NON-3GPP ACCESS NETWORK ELEMENT, AND METHOD FOR ACCESSING MOBILE NETWORK AND DE-ATTACHMENT

TECHNICAL FIELD

The present invention relates to the mobile communication field, and in particular, to a method for user equipment (UE) accessing a mobile network through a trusted non-$3^{rd}$ generation partnership project (3GPP), a trusted non-3GPP access network element and a method for detachment.

BACKGROUND OF THE RELATED ART

The Evolved Packet System (EPS) of the 3GPP is composed of the Evolved Universal Terrestrial Radio Access Network (E-UTRAN), the Mobility Management Entity (MME), the Serving Gateway (S-GW), the Packet Data Network Gateway (P-GW) and the Home Subscriber Server (HSS).

The EPS supports the intercommunication with the non-3GPP system (as shown in FIG. 1), wherein, the intercommunication with the non-3GPP system is realized through the S2a/b/c interface, and the P-GW is used as the anchor point between the 3GPP and non-3GPP system. In the system structure diagram of the EPS system, the non-3GPP system access is divided into an untrusted non-3GPP access and a trusted non-3GPP access; wherein the untrusted non-3GPP access needs to be connected with the P-GW through the Evolved Packet Data Gateway (ePDG), and the interface between the ePDG and the P-GW is S2b; the trusted non-3GPP access can be connected with the P-GW through the S2a interface directly, and the S2a interface performs the information interaction by adopting the PMIP protocol; in addition, the S2c interface provides the control and mobility support related to the user plane between the HE and the P-GW, and the mobility management protocol supported by the S2c interface is the Mobile IPv6 Support for Dual Stack Hosts and Routers (DSMIPv6), which can be used in the untrusted non-3GPP and trusted non-3GPP access.

The Wireless Local Area Network (WLAN) can be regarded as a non-3GPP system access EPS, and this involves the interconnection and intercommunication problem of the mergence of fixed network and mobile network that a lot of operators pay close attention to.

At present, there are a number of studies on the procedure and policy of intercommunication of the S2b and the S2c interfaces, and while the study on the S2a interface is little. In the related art, as shown in FIG. 2, after the UE completes the non-3GPP specific procedure and the extensible authentication protocol (LAP) authorization procedure, the Layer 3 (L3) message is performed between the UE and the trusted non-3GPP IP access network (TNAN) element, and then the trusted non-3GPP IP access network (TNAN) initiates a tunnel establishment procedure to the P-GW of the mobile core network after receiving the L3 message. Here, the L3 message is used as a way to trigger the TNAN and the P-GW to establish the tunnel, however, that message is not clear.

CONTENT OF THE INVENTION

The embodiment of the present invention provides a method for accessing a mobile network through a trusted non-3GPP and a trusted non-3GPP access network element and a detachment method, which realize accessing a mobile network through a trusted non-3GPP.

The method for accessing a mobile network through a trusted non-3GPP network of the embodiment of the present invention comprises:

after a trusted non-3GPP access network (TNAN) network element receives an extensible authentication protocol (LAP) authentication success message or an LAP authentication success triggering message, establishing a session with a packet data network gateway (P-GW) of a mobile network; and after the TNAN network element receives an IP address request message from user equipment, allocating an IP address consistent with the packet data network (PDN) type requested by the user equipment to the user equipment.

Preferably, the TNAN network element and the P-GW establish the session based on a GPRS Tunnel Protocol (GTP) or a Proxy Mobile Internet Protocol (PMIP).

Preferably, the step of establishing the session by the TNAN network element and the P-GW comprises:

the TNAN network element establishing a session with the P-GW for all PDN types subscribed by the user equipment, and carrying all PDN types subscribed by the user equipment when sending a session establishment request or a proxy bearer update message to the P-GW; and or, the TNAN network element establishing a session with the P-GW for every PDN type according to the PDN type subscribed by the user equipment, and carrying one PDN type subscribed by the user equipment each time when sending a session establishment request or a proxy bearer update message to the P-GW.

Preferably, the step of establishing the session by the TNAN network element and the P-GW comprises further comprises:

the TNAN network element obtaining the PDN type subscribed by the user equipment from an EAP authentication message during an EAP access authentication procedure of the user equipment.

Preferably, the PDN type subscribed by the user equipment is IPv4 and/or IPv6.

Preferably, the method further comprises:

when the IP address allocated by the P-GW for the user equipment is IPv4 address, the TNAN network element further storing an IPv4 timer sent by the P-GW in the session establishment procedure; and if the IPv4 timer times out and the TNAN network element does not receive the IP address request message that the user equipment requests the IPv4 address yet, then the TNAN network element indicating the P-GW to retrieve the IPv4 address.

Preferably, the TNAN network element indicates the GW to retrieve the IPv4 address through updating a bearer message or deleting a session message or a proxy bearer update message.

Preferably, the method further comprises: if the TNAN network element receives a Dynamic Host Configuration Protocol (DHCP) discovery message of the user equipment after the P-GW retrieves the IPv4 address, then the TNAN network element requesting the to allocate an IPv4 address for the user equipment, and sending the allocated IPv4 address to the user equipment.

Preferably, when the IP address request message is a routing request message, the TNAN network element considers that the PDN type requested by the user equipment is IPv6; and when the IP address request message is a DHCP discovery message, the TNAN network element considers that the PDN type requested by the user equipment is IPv4.

Preferably, the method further comprises: after the TNAN network element receives the IP address request message from the user equipment, if the PDN type requested by the user equipment is not the PDN type subscribed by the user equipment, then the TNAN network element returning a failure indication to the user equipment.

Preferably, the TNAN network element is an access controller (AC) or a broadband network gateway (BNG).

Preferably, the method further comprises:

the TNAN network element storing the IP address allocated by the P-GW for the user equipment in the session establishment procedure.

The embodiment of the present invention further provides a detachment method, comprising;

a trusted non-3GPP access network (TNAN) network element sending a Dynamic Host Configuration Protocol (DHCP) enforcement renew message to user equipment, to require the user equipment to re-request an IP address from the TNAN network element;

after the TNAN network element receives a DHCP request message sent by the user equipment, returning a DHCP negative acknowledgement message to the user equipment; and the TNAN network element receiving a DHCP discovery message sent by the user equipment, and the TNAN network element not allocating IP address for the user equipment.

Preferably, the TNAN network element sends the DHCP enforcement renew message under the following situation:

the TNAN network element receiving a detachment indication message from a Home Subscriber Server/Authentication, Authorization and Accounting (HSS/AAA); or, requiring to detach the user equipment because of a local management configuration; or, requiring to disconnect one PDN connection of the user equipment because of the local management configuration.

Preferably, the method further comprises: if there are a plurality of PDN connections existed in the user equipment, then the TNAN network element resending the DHCP enforcement renew message to the user equipment after disconnecting one PDN connection, and starting a disconnection of a next PDN connection, and performing that step repeatedly until a plurality of PDN connections of the user equipment are disconnected.

Preferably, the method further comprises: the TNAN network element returning a DHCP offer message to the user equipment after receiving the DHCP discovery message sent by the user equipment, wherein, an IP address option carried in the DHCP offer message is 0; and, returning the DHCP negative acknowledgement message carrying the IP address option being 0 to the user equipment after receiving the DHCP request message sent by the user equipment again.

The embodiment of the present invention further provides a trusted non-3GPP access network (TNAN) network element, comprising an address obtaining unit and an address allocation unit, wherein, the address obtaining unit is configured to: after receiving an extensible authentication protocol (EAP) authentication success message or an RAP authentication success triggering message, establish a session with a packet data network gateway (P-GW) of a mobile network; and the address allocation unit is configured to: after receiving an IP address request message from the user equipment, allocate an IP address consistent with packet data network (PDN) type requested by the user equipment to the user equipment.

Preferably, the address obtaining unit is configured to establish the session with the P-GW based on a GPRS Tunnel Protocol (GTP) or a Proxy Mobile Internet Protocol (PAW).

Preferably, the address obtaining unit is configured to establish the session with the P-GW by the following mode:

establishing a session with the P-GW for all PDN types subscribed by the user equipment, and carrying all PDN types subscribed by the user equipment when sending a session establishment request or a proxy bearer update message to the P-GW; and or, establishing a session with the P-GW for every PDN type according to the PDN type subscribed by the user equipment, and carrying one PDN type subscribed by the user equipment each time when sending a session establishment request or a proxy bearer update message to the P-GW.

Preferably, the address obtaining unit is configured to obtain the PDN type subscribed by the user equipment by the following mode:

obtaining the PDN type subscribed by the user equipment from an EAP authentication message during an EAP access authentication procedure of the user equipment.

Preferably, the PDN type subscribed by the user equipment is IPv4 and/or IPv6.

Preferably, the address obtaining unit is further configured to: when the IP address allocated by the P-GW for the user equipment is IPv4 address, store an IPv4 timer sent by the P-GW in the session establishment procedure; and the address allocation unit is further configured to: if the IPv4 timer times out and the IP address request message that the user equipment requests the IPv4 address is not received yet, then indicate the P-GW to retrieve the IPv4 address.

Preferably, the address allocation unit is configured to indicate the P-GW to retrieve the IPv4 address through updating a bearer message or deleting a session message or a proxy bearer update message.

Preferably, the address allocation unit is further configured to: if a Dynamic Host Configuration Protocol (DHCP) discovery message of the user equipment is received after the P-GW retrieves the IPv4 address, then request the P-GW to allocate an IPv4 address for the user equipment, and send the allocated IPv4 address to the user equipment.

Preferably, the address allocation unit is further configured to: when the IP address request message is a routing request message, consider that the PDN type requested by the user equipment is IPv6; and when the IP address request message is a DHCP discovery message, consider that the PDN type requested by the user equipment is IPv4.

Preferably, the address allocation unit is further configured to: after the IP address request message from the user equipment is received, if the PDN type requested by the user equipment is not the PDN type subscribed by the user equipment, then return a failure indication to the user equipment.

Preferably, the TNAN network element is an access controller (AC) or a broadband network gateway (BNG).

Preferably, the address obtaining unit is further configured to store the IP address allocated by the P-GW for the user equipment in the session establishment procedure.

The embodiment of the present invention further provides a trusted non-3GPP access network (TNAN) network element, comprising a detachment unit, configured to:

send a Dynamic Host Configuration Protocol (DHCP) enforcement renew message to user equipment, to require the user equipment to re-request an IP address from the TNAN network element;

and, after a DHCP request message sent by the user equipment is received, return a DHCP negative acknowledgement message to the user equipment;

and, receive a DHCP discovery message sent by the user equipment, and not allocate IP address for the user equipment.

Preferably, the detachment unit is configured to send the DHCP enforcement renew message under the following situation:

receiving a detachment indication message from a Home Subscriber Server/Authentication, Authorization and Accounting (HSS/AAA); or, requiring to detach the user equipment because of a local management configuration; or, requiring to disconnect one PDN connection of the user equipment because of the local management configuration.

Preferably, the detachment unit is further configured to: if there are a plurality of PDN connections existed in the user equipment, then resend the DHCP enforcement renew message to the user equipment after disconnecting one PDN connection, and start a disconnection of a next PDN connection, and perform that step repeatedly until a plurality of PDN connections of the user equipment are disconnected.

Preferably, the detachment unit is further configured to: return a DHCP offer message to the user equipment after receiving the DHCP discovery message sent by the user equipment, wherein, an IP address option carried in the DHCP offer message is 0; and, return the DHCP negative acknowledgement message carrying the IP address option being 0 to the user equipment after receiving the DHCP request message sent by the user equipment again.

The embodiment of the present invention provides a method for accessing a mobile network through a trusted non-3GPP and a trusted non-3GPP access network element which realizes accessing a mobile network through a trusted non-3GPP, and detaching from the mobile network.

PREFERRED EMBODIMENTS OF THE PRESENT INVENTION

Figure 1:
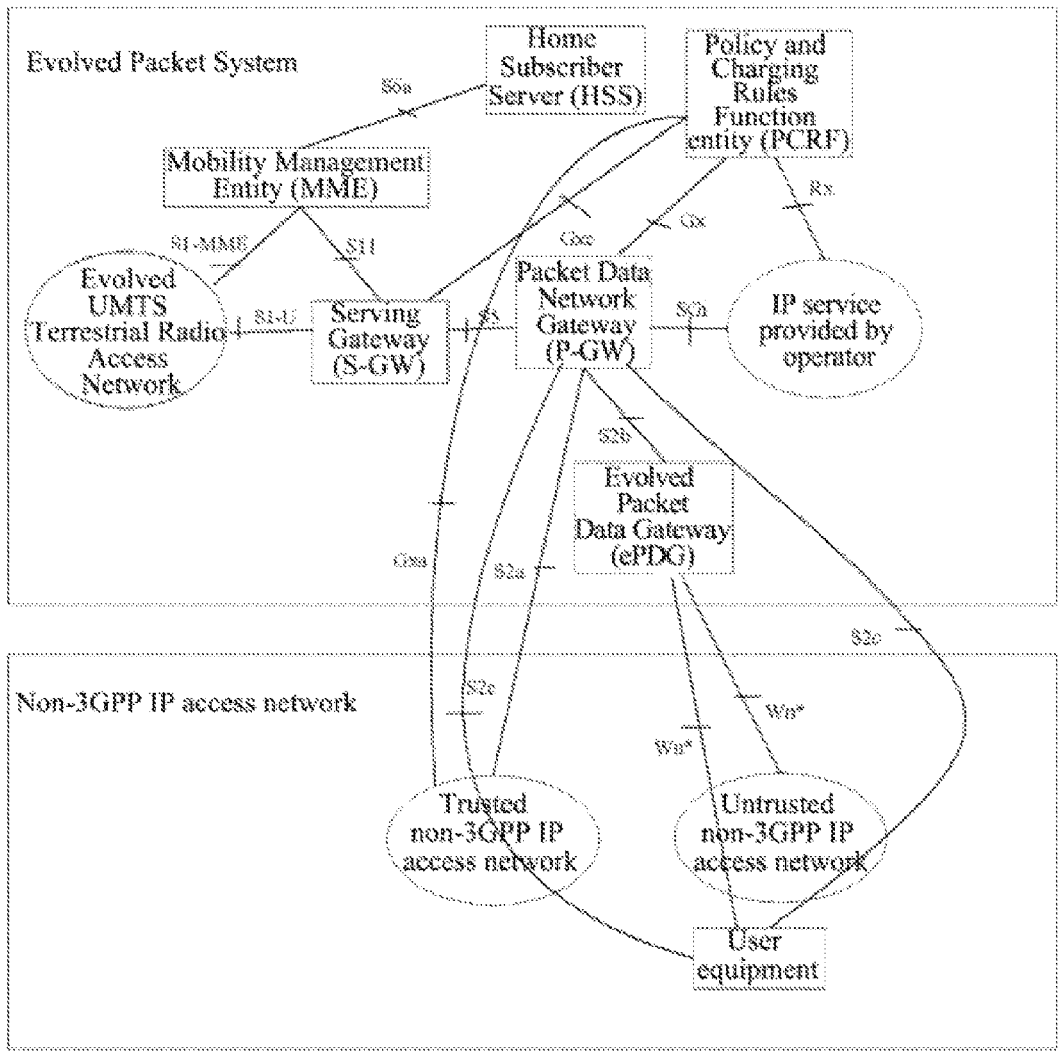
FIG. 1 is a network structure diagram of intercommunication between the 3GPP network and the non-3GPP network in the related art.
Figure 2:
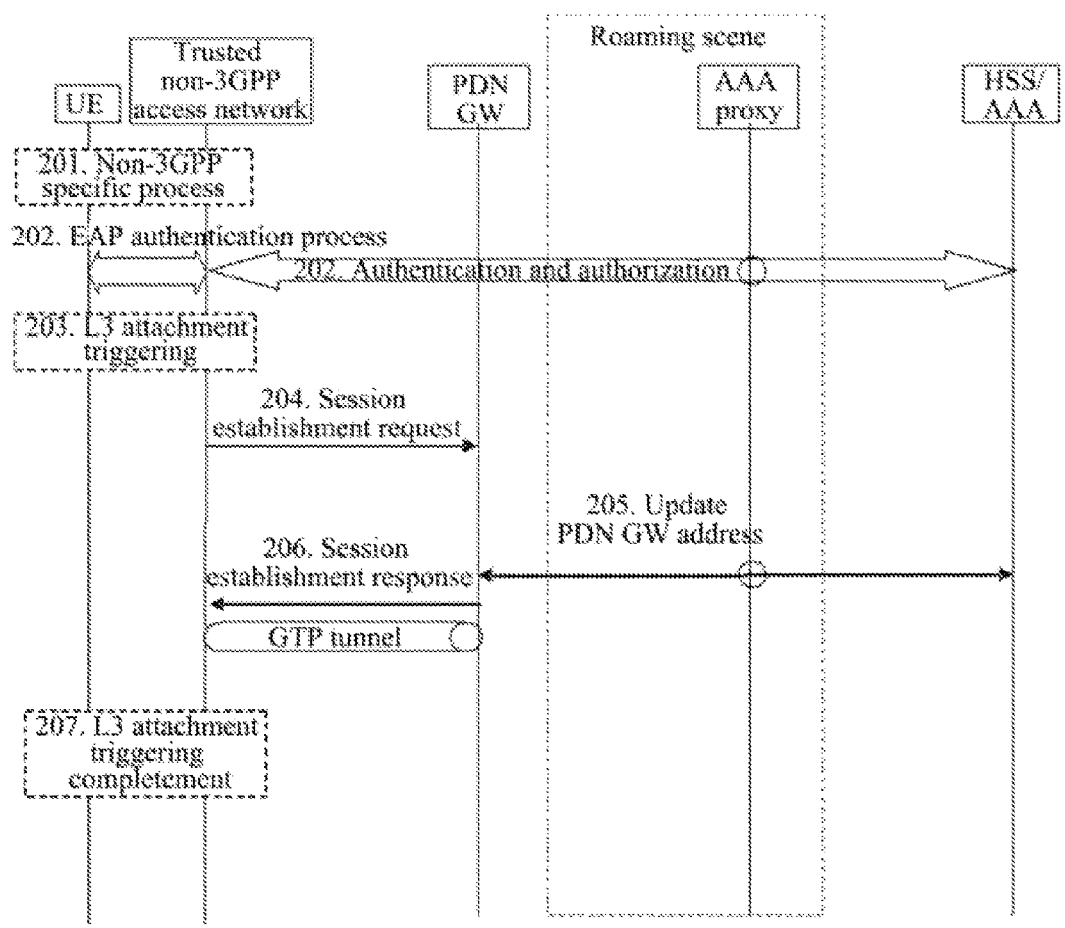
FIG. 2 is a flow chart of UE accessing an EPS through a trusted WLAN in the related art.

The embodiment of the present invention is described in detail with reference to the accompanying drawings hereinafter. It should be illustrated that, in the case of not conflicting, the embodiments in the present application and features in these embodiments can be combined with each other.

Besides an L3 message, a Layer 2 (L2) message also can be a triggering mode, for example: an EAP message. The advantage of adopting the EAP message is that there is no need to add an message or other L2 message additionally in the relevant procedure.

In the embodiment of the present invention, regarding the WLAN as the trusted non-3GPP system is used as an example to study the problem of the interconnection and intercommunication that the UE accesses the EPS through an S2a interface, and accessing a mobile network through other trusted non-3GPP systems is similar with that through the WLAN.

The embodiment of the present invention provides a method for accessing a mobile network through a trusted non-3GPP network, including the following steps:

after a trusted non-3GPP access network (TNAN) network element receives an extensible authentication protocol (EAP) authentication success message or an EAP authentication success triggering message, a session with a packet data network gateway (P-GW) is established, and an IP address allocated by the P-GW for the UE during a session establishment procedure can be stored; and after the TNAN network element receives an IP address request message from the UE, if there is an IP address consistent with the packet data network (PDN) type requested by the UE locally, then the IP address is allocated to the UE.

Preferably, the TNAN network element and the P-GW establish the session based on a GPRS Tunnel Protocol (GTP) or a Proxy Mobile Internet Protocol (PMIP). Wherein, the session establishment request message can be a session establishment request message of the GTP or a proxy bearer update message of the PMIP.

Preferably, establishing the session by the TNAN network element and the P-GW includes the following steps:

the TNAN network element establishing a session with the P-GW for all PDN types subscribed by the user equipment, and all PDN types subscribed by the user equipment being carried when sending a session establishment request or a proxy bearer update message to the P-GW; and or, the TNAN network element establishing a session with the P-GW for every PDN type according to the PDN type subscribed by the user equipment, and one PDN type subscribed by the user equipment being carried when sending a session establishment request or a proxy bearer update message to the P-GW.

Preferably, the TNAN network element obtains the PDN type subscribed by the user equipment from an EAP authentication message during an EAP access authentication procedure of the user equipment. The EAP authentication message includes a message interacted in the EAP authentication process.

Preferably, the PDN type subscribed by the user equipment is IPv4 and/or IPv6.

Preferably, the TNAN network element can be an access controller (AC) or a broadband network gateway (BNG).

Preferably, the IP address request message includes a routing request message and a DHCP discovery message.

Preferably, when the TNAN network element receives a broadcast routing request message, the TNAN network element considers that the requested PDN type is IPv6; and when the TNAN network element receives the DHCP discovery message, the TNAN network element considers that the requested PDN type is IPv4.

Preferably, if the PDN type requested by the UE is not consistent with that of a locally stored IP address, then the TNAN network element returns a failure indication to the UE.

Preferably, when the IP address allocated by the P-GW for the user equipment is IPv4 address, the TNAN network element further stores an IPv4 timer sent by the P-GW in the session establishment procedure; and if the IPv4 timer times out and the TNAN network element does not receive the address request message that the user equipment requests the IPv4 address yet, then the TNAN network element indicates the P-GW to retrieve the IPv4 address.

Preferably, the TNAN network element indicates the P-GW to retrieve the IPv4 address through updating a bearer message or deleting a session message or a proxy bearer update message.

The embodiment of the present invention further provides a detachment method, including the following steps:

a trusted non-3GPP access network (TNAN) network element sends a Dynamic Host Configuration Protocol (DHCP) enforcement renew message to UE, to require the UE to re-request an IP address from the DHCP server, and its objective is to terminate the service connection of the UE through initiating that message;

after the UE receives the DHCP enforcement renew message, it will initiate a DHCP request message to the TNAN network element, to reapply for the IP address;

after the DHCP request message is received, the TNAN network element returns a DHCP negative acknowledgement; and the UE resends the DHCP discovery message to the TNAN network element, and the TNAN network element will not allocate the IP address for the UE.

The TNAN network element sends the DHCP enforcement renew message under the following situation:

preferably, the TNAN network element receives a detachment indication message from a Home Subscriber Server/Authentication, Authorization and Accounting (HSS/AAA); or, requires to detach the user equipment because of a local management configuration; or, requires to disconnect one PDN connection of the user equipment because of the local management configuration.

Preferably, if there are a plurality of PDN connections existed in the user equipment, then the TNAN network element resends the DHCP enforcement renew message to the user equipment after disconnecting one PDN connection, starting a disconnection of a next PDN connection, and that step is performed repeatedly until a plurality of PDN connections of the user equipment are disconnected.

Preferably, the TNAN network element returns a DHCP offer message to the UE after receiving the DHCP discovery message sent by the UE, wherein, an IP address option carried in the DHCP offer message is 0; and, the TNAN network element returns the DHCP negative acknowledgement message with the IP address option being 0 to the UE after receiving the DHCP request message sent by the UE again. Thereby, the UE cannot receive the IP address and thus releasing the related resource information.

In the embodiment of the present invention, when the UE accesses the EPS through the trusted non-3GPP system, the EAP authentication success message triggers the TNAN network element to initiate the tunnel establishment to P-GW of the mobile core network. The TNAN network element requests the P-GW for IP address and store it temporarily, and subsequently, the UE obtain the IP address from the TNAN network element through the IP address request message.

Embodiment 1

Figure 3:
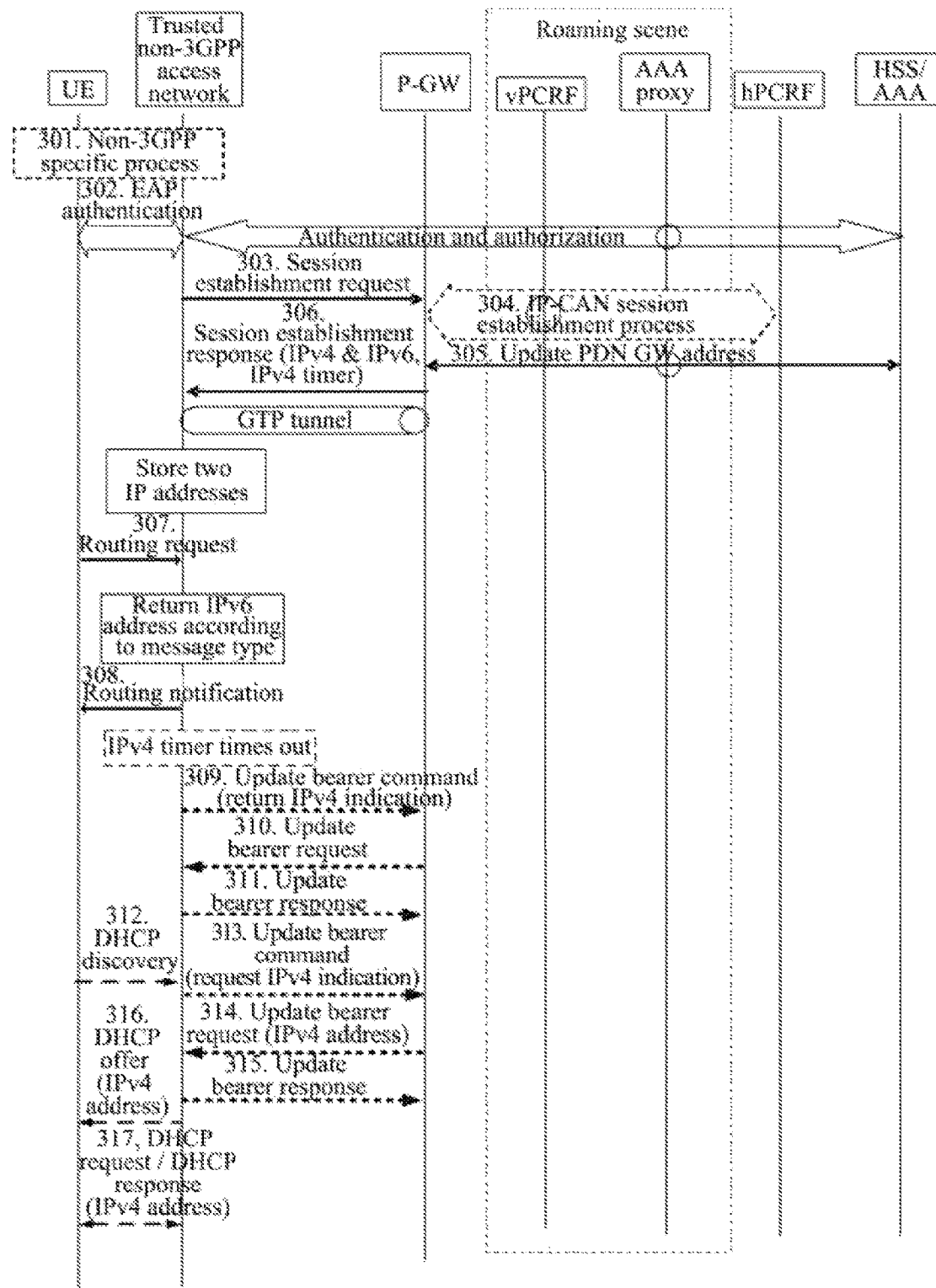
FIG. 3 is the workflow 1 that an EAP authentication triggers the UE to access an EPS through a trusted WLAN in embodiment 1 of the present invention.
Figure 4:
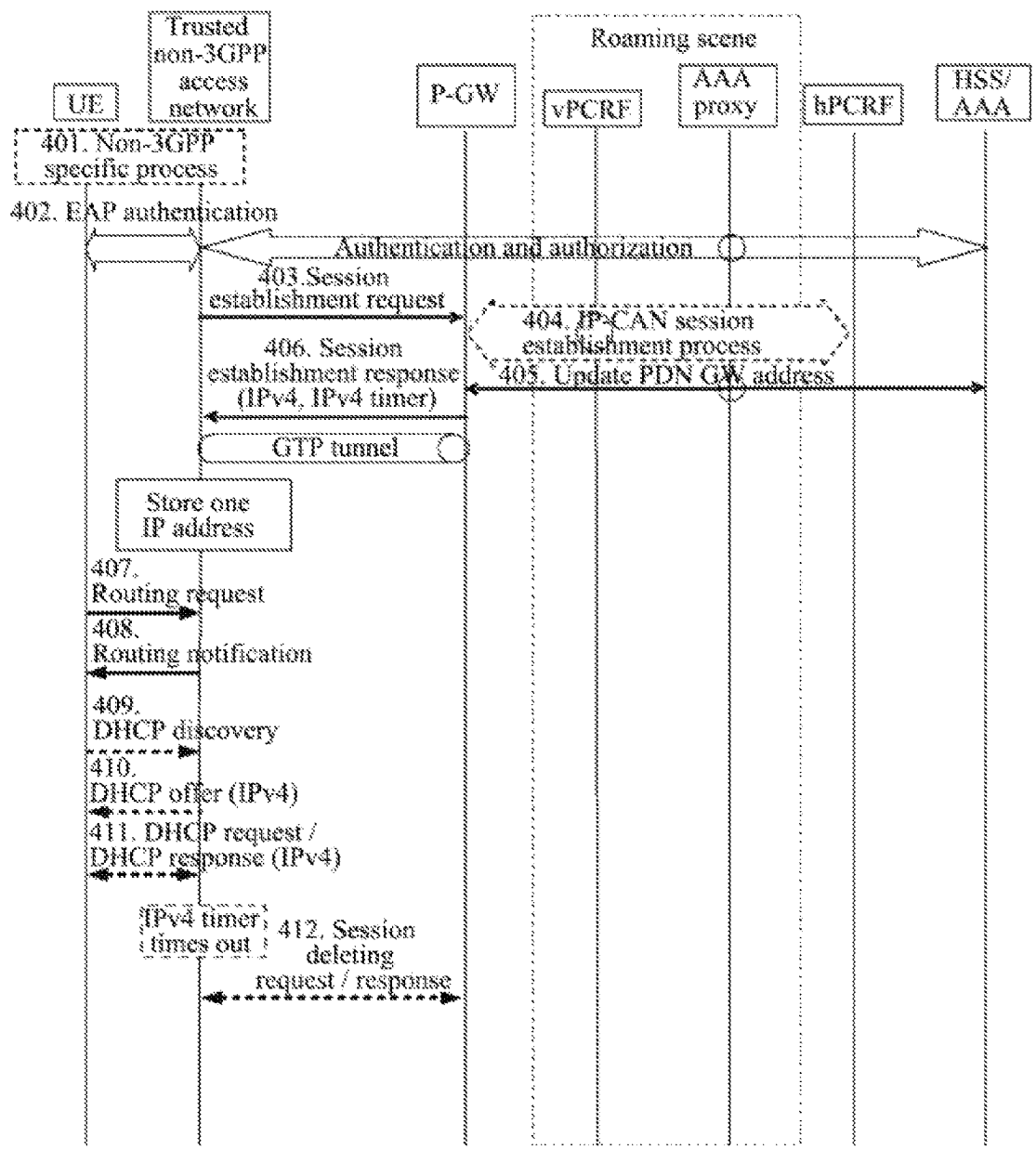
FIG. 4 is the workflow 2 that an EAP authentication triggers the UE to access an EPS through a trusted WLAN in embodiment 2 of the present invention.

In that embodiment, it mainly describes that, under the prerequisite that the UE subscribes for two kinds of address types, IPv4 and IPv6, at the same time, for the IPv4 address request, the TNAN network element itself is regarded as the DHCP server. The TNAN network element and the P-GW establish a session, the P-GW allocates two IP addresses to the UE through one session, and the TNAN network element can store the two IP addresses allocated by P-GW for the UE temporarily; when the UE only requests the IPv6 address therein, the TNAN network element makes the unused IPv4 address be retrieved by the P-GW in time through updating a bearer message, as shown in FIG. 3.

For the problem that the UE only requests the IPv4 address therein while there is no need to consider how to deal with the IPv6 address, since the current 3GPP standard thinks that the IPv6 address is very sufficient and there is no need to consider the problem that how to deal with the unused IPv6 address, the IPv6 address will be retrieved by the P-GW when the session between the TNAN network element and the P-GW is deleted.

In step 301: the UE and the TNAN network element perform the non-3GPP specific processes.

In steps 302-303: the UE performs the EAP access authentication based on the 3GPP, and in the EAP access authentication procedure, the PDN types subscribed by the UE obtained by the TNAN network element are IPv4 and IPv6; after the TNAN network element receives an authentication success message returned by the HSS/AAA or receives an authentication success triggering message returned by the HSS/AAA, it initiates a session establishment request to the P-GW, and the message carries the PDN type subscribed by the HE.

In steps 304-305: the P-GW finishes the process for establishing the IP-CAN session and updating the P-GW address.

In step 306: after the P-GW receives the session establishment request, according to the PDN types subscribed by the UE being IPv4 and IPv6, it will allocate two IP addresses for the UE and send a session establishment response to the TNAN network element, and the message carries the IPv4 address and IPv6 address allocated to the UE and carries an IPv4 timer. After the TNAN network element receives that message, it stores the IPv4 address, the IPv6 address and the IPv4 timer locally.

In steps 307-308: the UE will send a routing request message by way of broadcasting timely, and after the TNAN network element receives that message, it sends a routing notification message to the UE according to the information of supporting the IPv6 implied in the routing request message, and the message carries the IPv6 address.

In step 309: if the TNAN network element does not receive the DHCP discovery message sent by the UE yet when the IPv4 timer times out, then it sends an update bearer command to the P-GW, and the message carries an instruction for retrieving the IPv4 address.

In step 310: the P-GW receives the update bearer command, and it will find its related IPv4 addresses according to a bearer identification and send an update bearer request message to the TNAN network element, and the message can carry or cannot carry the IPv4 address; even when it does not carry the IPv4 address, the TNAN network element can find the IPv4 address to be retrieved according to the bearer identification.

In step 311: after the TNAN network element receives the update bearer request message, the TNAN network element will find its related IPv4 addresses according to the IPv4 address carried in the message, or according to the bearer identification if the message does not carry the IPv4 address, and then it releases the IPv4 address locally and sends an update bearer response message to the P-GW; after the P-GW receives the update bearer response message, it will retrieve the IPv4 address to a local address pool or a server allocated by an outside IP address.

In step 312: subsequently, if the TNAN network element receives a Dynamic Host Configuration Protocol (DHCP) discovery message sent by the UE, but the TNAN network element has already released the IPv4 address, then the TNAN network element sends the update bearer command to the P-GW according to the IPv4 address type implicitly supported by the message type, and the message carries the indication for requesting the IPv4 address.

In step 313: after the P-GW receives the update bearer command, it will allocate an IPv4 address for the UE according to the indication for requesting the IPv4 address, and sends the update bearer request message to the TNAN network element, and the message carries the IPv4 address.

In steps 314-316: after the TNAN network element receives the update bearer request message, it obtains the IPv4 address from the message and sends the DHCP offer message to the UE, and the message carries the IPv4 address; and it will also send the update bearer response message to the P-GW at the same time.

In step 317: the DHCP request and DHCP acknowledgement procedures are completed between the UE and the TNAN network element, and the UE obtains the IPv4 address.

Embodiment 2

That embodiment is the same as the embodiment 1; for the IPv4 address request, the TNAN network element itself is regarded as the DHCP server. The TNAN network element and the P-GW establish a session. However, the UE only subscribes the IPv4 address type, and the TNAN network element can store the IPv4 address allocated by P-GW for the UE temporarily; the specific process when the UE only requests the IPv6 address and the problem that the unused IPv4 address is retrieved reasonably are mainly solved.

In step 401: the UE and the TNAN network element perform the non-3GPP specific processes.

In steps 402-403: the UE performs the EAP access authentication based on the 3GPP, and in the EAP access authentication procedure, the PDN types subscribed by the UE obtained by the TNAN network element are IPv4 and IPv6; after the TNAN network element receives an authentication success message returned by the HSS/AAA or receives an authentication success triggering message returned by the HSS/AAA, it initiates a session establishment request to the P-GW, and the message carries the PDN type subscribed by the HE.

In steps 404-405: the P-GW finishes the process fir establishing the IP-CAN session and updating the P-GW address.

In step 406: after the P-GW receives the session establishment request, according to the PDN types subscribed by the UE carried in the message, it sends a session establishment response to the TNAN network element, and the message carries the IPv4 address allocated for the UE and carries an IPv4 timer. After the TNAN network element receives that message, it stores the IPv4 address and the IPv4 timer locally.

In step 407: the UE will send a routing request message by way of broadcasting timely.

In step 408: after the TNAN network element receives that routing request message, according to the information of supporting the IPv6 implied in the routing request message, it will know that the UE wants to request the IPv6 address, which is inconsistent with the PDN type subscribed by the UE. Allocating the IPv6 address for the UE is not supported, so the TNAN network element sends a routing notification message to the UE, and the message carries an indication which explains that the allocation of IPv6 is not supported. That indication can be extended in the routing notification message, or a definition of a special value can be added in the message parameter to implicitly explain not supporting the allocation of IPv6. After the UE receives the routing notification message, it knows that the network does not support the allocation of the IPv6 address according to the indication and does not obtain the IPv6 address. So, this UE is unable to get access to the core network.

In steps 409-411: subsequently, before the IPv4 timer times out, if the TNAN network element receives the DHCP discovery message, then the TNAN network element allocates the IPv4 address for the UE through the DHCP offer message according to the IPv4 address type implicitly supported by the message type.

If there are no steps 409-411 occurring, then the following step will be executed:

in step 412: if the TNAN network element does not receive the DHCP discovery message sent by the UE yet when the IPv4 timer times out, then it executes a process for deleting the session with the P-GW, to delete the session and release the IPv4 address.

Embodiment 3

Figure 5:
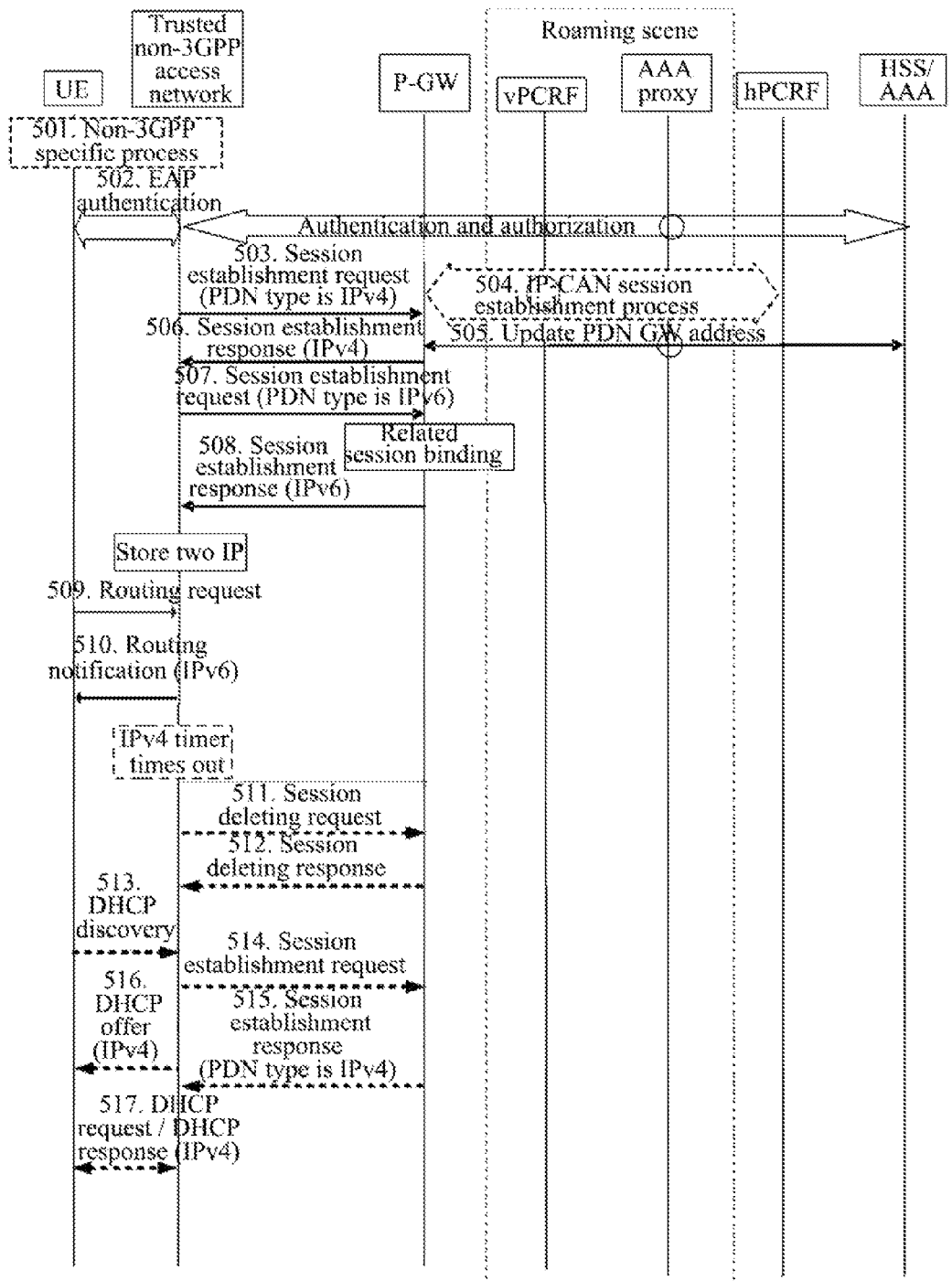
FIG. 5 is the workflow 3 that an EAP authentication triggers the UE to access an EPS through a trusted WLAN in embodiment 3 of the present invention.
Figure 6:
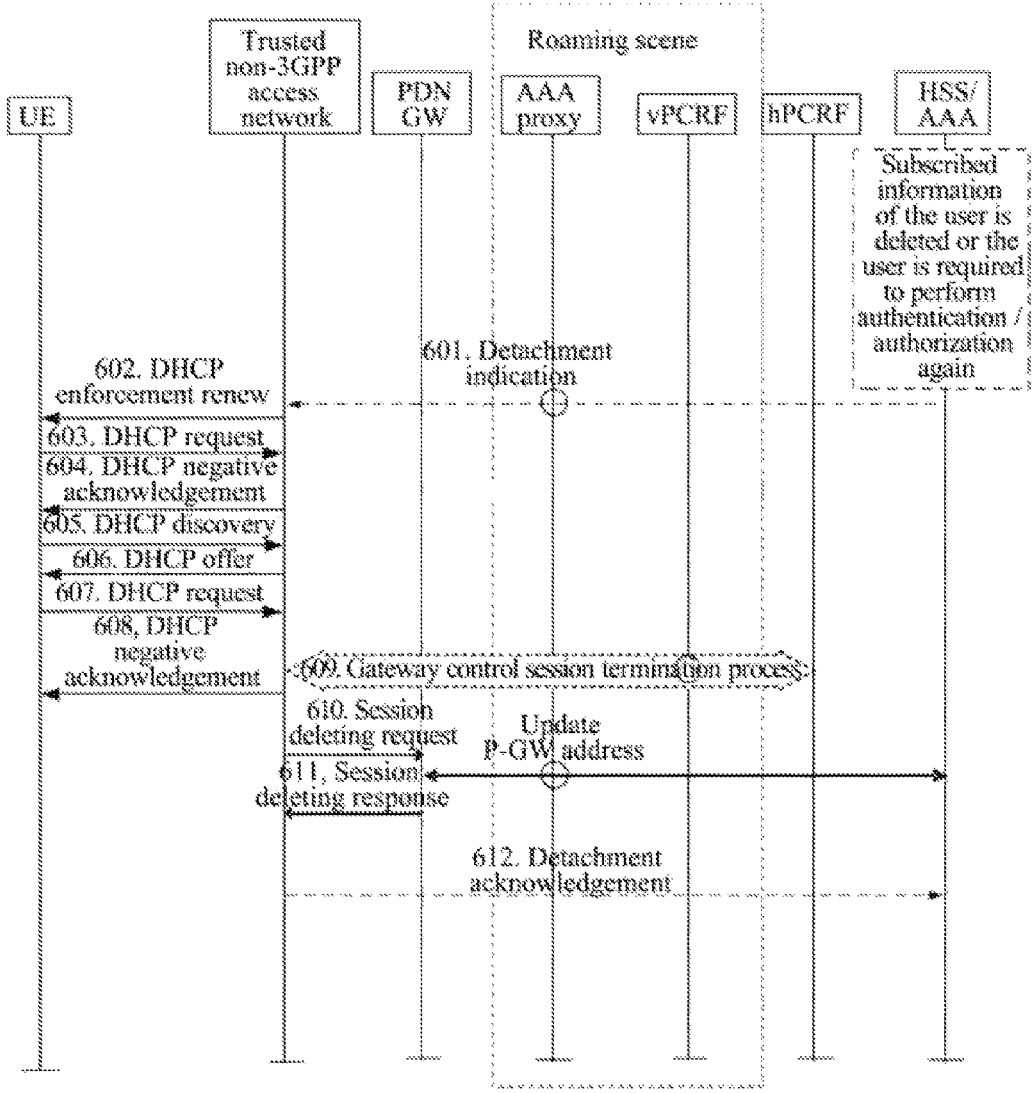
FIG. 6 is a detachment workflow initiated by a network side in embodiment 4 of the present invention.

The difference between that embodiment and the embodiment 1 lies in that there are two tunnel sessions established between the TNAN network element and the P-GW; one is used for transmitting the IPv4 address, and the other is used for transmitting the IPv6 address; so, when the UE only requests the IPv6 address therein, the processes that how to deal with the IPv4 address are different, as shown in FIG. 5, including the following steps.

Steps 501-502 are the same as steps 301-302.

In step 503: in the EAP access authentication procedure, the PDN types subscribed by the UE obtained by the TNAN network element are IPv4 and IPv6; after the TNAN network element receives an authentication success message returned by the HSS/AAA or receives an authentication success triggering message returned by the HSS/AAA, it initiates a session establishment request to the P-GW, and the PDN type subscribed by the UE and carried in the message is IPv4.

Steps 504-505 are same as steps 304-305.

In step 506: after the P-GW receives the session establishment request, according to the PDN types subscribed by the UE carried in the message, it sends a session establishment response message to the TNAN network element, and the message carries the IPv4 address allocated for the UE and carries an IPv4 timer. After the TNAN network element receives that message, it stores the IPv4 address and the IPv4 timer locally.

In steps 507-508: the TNAN network element and the P-GW establish one new session therebetween, and the PDN type subscribed by the UE carried in the message is IPv6. The P-GW sends the session establishment response message to the TNAN network element. The TNAN network element obtains the IPv6 address from the message after receiving the session establishment response message, and stores the IPv6 address locally.

Here it needs to be explained that the P-GW needs to correlate those two sessions as the two sessions belong to one UE, and the TNAN network element also needs to perform the session correlation.

In steps 509-510: the UE will send a broadcasting routing request message timely, and after the TNAN network element receives that message, it sends a routing notification message to the UE according to the information of supporting the IPv6 implied in the routing request message, and the routing notification message carries the IPv6 address.

In step 511: if the TNAN network element does not receive the DHCP discovery message sent by the UE yet when the IPv4 timer times out, then it sends a session deleting request message to the P-GW, and the session identification is corresponding to the session identification for transmitting the IPv4.

In step 512: the P-GW deletes the information corresponding to the session locally after receiving the session deleting request message, and sends a session deleting response message to the TNAN network element.

In step 513: subsequently, when the TNAN network element receives the DHCP discovery message, it sends the session establishment request to the P-GW according to the IPv4 address type implicitly supported by the message type, and the PDN type carried in the message is the IPv4.

In step 514: after the P-GW receives the session establishment request, it sends a session establishment response message to the TNAN network element, and the message carries the IPv4 address allocated for the UE and carries the IPv4 timer.

In steps 515-517: after the TNAN network element receives the session establishment response message, it obtains the IPv4 address and sends the DHCP offer message to the UE, and the message carries the IPv4 address; and then the DHCP request and response processes are executed, and allocating the IPv4 address to the UE is completed.

Embodiment 4

In the embodiment, it mainly describes the detachment procedure initiated by the network side, including: the one initiated by the HSS/AAA, or the one initiated by the TNAN network element as a DHCP server.

For the detachment procedure, if a plurality of PDN connections have already been established, then steps 602-611 need to be repeated when disconnecting each PDN connection.

In step 601: since the subscribed information of the user is deleted or the user is required to authorize/authorize again and so on, the HSS/AAA will send a detachment indication message to the TNAN network element.

In step 602: the TNAN network element supports the function of the DHCP server, and when the detachment indication message is received, or because of a local management configuration, for example: an administrator need to detach that UE or disconnect one PDN connection of that UE by force because of equipment maintenance or other cases, then a DHCP enforcement renew message is initiated to the UE, to require the UE to request the IP address from the DHCP server again.

In steps 603-604: after the UE receives the DHCP enforcement renew message, it initiates the DHCP request message to the TNAN network element, to apply for the IP address again. After the TNAN network element receives the DHCP request message, it does not hope to allocate one new IP address for the UE, and then it returns a DHCP NAK (negative acknowledgement) back to the UE.

In steps 605-608: the UE sends the DHCP discovery message to the TNAN network element again, to enter the normal DHCP address allocation request procedure. However, since the objective of initiating the DHCP enforcement renew message by the TNAN network element is to detach that UE and it will not allocate the IP address for the UE, the IP address option carried in the DHCP offer message sent by the TNAN network element to the UE is 0; subsequently, when the TNAN network element receives the DHCP request message, the TNAN network element returns the DHCP negative acknowledgement message to the UE, and the IP address option carried in the message is also 0. So, the UE is unable to obtain the IP address and release the related resource information.

In steps 609-611: the TNAN network element can initiate a gateway control session and deletion of the session when sending the DHCP enforcement renew message, and those operations can occur at any point in steps 602-608 and do not have precedence order with step 602.

In step 612: the TNAN network element sends a detachment acknowledgement message to the HSS/AAA.

Embodiment 4 is mainly described according to the DHCPv4 procedure, and this kind of triggering mode is suitable for the DHCPv6 as well; the difference lies in that there is difference between the definition of the specific message of the DHCPv6 and the definition of the DHCPv4, which can be replaced by using the corresponding message.

In the above-mentioned embodiments, it is a GTP tunnel established between the TNAN network element and the P-GW, and the invention is suitable for the establishment of the PMIP tunnel as well, which can be replaced by adopting the corresponding message, for example: the proxy bearer update message replaces the session establishment updating deleting request message, a proxy bearer acknowledgement message replaces the session establishment updating deleting response message, and the parameters required to be added are suitable for the PMIP message as well.

In addition, the IPv6 address that the TNAN network element obtains from the P-GW is interpreted as an IPv6 address prefix, likewise, the IPv6 address that the UE obtains from the TNAN network element is interpreted as an IPv6 address prefix.

Figure 7:
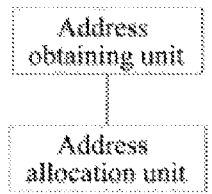
FIG. 7 is a block diagram of TNAN network elements of the embodiments of the present invention.

The embodiment of the present invention provides a trusted non-3GPP access network (TNAN) network element, including an address obtaining unit and an address allocation unit, as shown in FIG. 7, wherein, the address obtaining unit is configured to: after receiving an extensible authentication protocol (EAP) authentication success message or an EAP authentication success triggering message, establish a session with a packet data network gateway (P-GW) of a mobile network, and store an IP address allocated by the P-GW for user equipment during a session establishment procedure; and the address allocation unit is configured to: after receiving an IP address request message from the user equipment, allocate the IP address to the user equipment if there is an IP address consistent with the packet data network (PDN) type requested by the user equipment locally.

Preferably, the address obtaining unit is configured to establish the session with the P-GW based on a GPRS Tunnel Protocol (GTP) or a Proxy Mobile Internet Protocol (PMIP).

Preferably, the specific method for the address obtaining unit and the P-GW to establish the session refers to the method embodiment.

Preferably, the address obtaining unit is configured to obtain the PDN type subscribed by the user equipment by the following mode:

obtaining the PDN type subscribed by the user equipment from an EAP authentication message during an EAP access authentication procedure of the user equipment.

The address obtaining unit is further configured to: when the IP address allocated by the P-GW for the user equipment is IPv4 address, store an IPv4 timer sent by the P-GW in the session establishment procedure; and the address allocation unit is further configured to: if the IPv4 timer times out and the IP address request message that the user equipment requests the IPv4 address has not been received yet, then indicate the P-GW to retrieve the IPv4 address.

Preferably, the address allocation unit is configured to indicate the P-GW to retrieve the IPv4 address through updating a bearer message or deleting a session message or a proxy bearer update message.

Preferably, the address allocation unit is further configured to: if a Dynamic Host Configuration Protocol (DHCP) discovery message of the user equipment is received after the P-GW retrieves the IPv4 address, then request the P-GW to allocate an IPv4 address for the user equipment, and send the allocated IPv4 address to the user equipment.

Preferably, the address allocation unit is further configured to: when the IP address request message is a routing request message, consider that the PDN type requested by the user equipment is IPv6; and when the IP address request message is a DHCP discovery message, consider that the PDN type requested by the user equipment is IPv4.

Preferably, the address allocation unit is further configured to: after the IP address request message from the user equipment is received, if the PDN type requested by the user equipment is not the PDN type subscribed by the user equipment, then return a failure indication to the user equipment.

Preferably, the TNAN network element is an access controller (AC) or a broadband network gateway (BNG).

The embodiment of the present invention further provides a trusted non-3GPP access network (TNAN) network element, comprising a detachment unit, configured to:

send a Dynamic Host Configuration Protocol (DHCP) enforcement renew message to user equipment, to require the user equipment to re-request an IP address from the TNAN network element;

and, after a DHCP request message sent by the user equipment is received, return a DHCP negative acknowledgement message to the user equipment;

and, receive a DHCP discovery message sent by the user equipment, and not allocate IP address for the user equipment.

Preferably, the detachment unit is configured to send the DHCP enforcement renew message under the following situation:

receiving a detachment indication message from a Home Subscriber Server/Authentication, Authorization and Accounting (HSS/AAA); or, requiring to detach the user equipment because of a local management configuration; or, requiring to disconnect one PDN connection of the user equipment because of the local management configuration.

Preferably, the detachment unit is further configured to: if there are a plurality of PDN connections existed in the user equipment, then resend the DHCP enforcement renew message to the user equipment after disconnecting one PDN connection, and start a disconnection of a next PDN connection, and perform that step repeatedly until a plurality of PDN connections of the user equipment are disconnected.

Preferably, the detachment unit is further configured to: return a DHCP offer message to the user equipment after receiving the DHCP discovery message sent by the user equipment, wherein, an IP address option carried in the DHCP offer message is 0; and, return the DHCP negative acknowledgement message carrying the IP address option being 0 to the user equipment after receiving the DHCP request message sent by the user equipment again.

The embodiment of the present invention further provides a TNAN network element including the above-mentioned address obtaining unit, address allocation unit and detachment unit.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present invention is not limit to any specific form of the combination of the hardware and software.

The above description is only the preferred embodiments of the present invention and is not intended to limit the present invention. For those skilled in the art, the present invention can have various modifications and variations. All of modifications, equivalents and/or variations and so on without departing from the spirit and essence of the present invention should be included in the protection scope of the present invention.

INDUSTRIAL APPLICABILITY

The embodiment of the present invention realizes accessing a mobile network through a trusted non-3GPP and detaching from a mobile network.

What we claim is:

1. A method for accessing a mobile network through a trusted non-3GPP network, comprising:

after a trusted non-3GPP access network (TNAN) network element receives an extensible authentication protocol (EAP) authentication success message or an EAP authentication success triggering message, establishing, by the TNAN network element, a session with a packet data network gateway (P-GW) of a mobile network, obtaining and storing one or more IP addresses allocated by the P-GW, after the TNAN network element receives an IP address request message from a user equipment (UE), sending the UE an IP address which is allocated by the P-GW and is consistent with a packet data network (PDN) type requested by the UE in the IP address request message.

2. The method according to claim 1, wherein, the session established by the TNAN network element with the P-GW is based on a GPRS Tunnel Protocol (GTP) or a Proxy Mobile Internet Protocol (PMIP).

3. The method according to claim 2, wherein, the step of establishing, by the TNAN network element, the session with the P-GW comprises:
obtaining, by the TNAN network element, the PDN types subscribed by the UE from an EAP authentication message during an EAP access authentication procedure of the UE;
establishing, by the TNAN network element, the session with the P-GW for all the PDN types subscribed by the UE, and carrying all the PDN types subscribed by the UE when sending a session establishment request or a proxy bearer update message to the P-GW; or, establishing, by the TNAN network element, one session with the P-GW for one PDN type according to the PDN types subscribed by the UE, and carrying one PDN type subscribed by the UE each time when sending a session establishment request or a proxy bearer update message to the P-GW in each session;
wherein, the one or more PDN types subscribed by the UE are IPv4 and/or IPv6.

4. The method according to claim 3, further comprising:
when an IP address allocated by the P-GW for the UE is an IPv4 address, receiving, by the TNAN network element, a session establishment response sent by the P-GW in a session establishment procedure, and storing at least the IPv4 address and an IPv4 timer carried in the session establishment response; and
if the IPv4 timer times out and the TNAN network element has not received the IP address request message that the UE requests the IPv4 address yet, then indicating, by the TNAN network element, the P-GW to retrieve the IPv4 address.

5. The method according to claim 4, further comprising: indicating, by the TNAN network element, the P-GW to retrieve the IPv4 address through a bearer update message or a session deleting message or a proxy bearer update message.

6. The method according to claim 5, further comprising:
receiving, by the TNAN network element, a Dynamic Host Configuration Protocol (DHCP) discovery message of the UE after the P-GW retrieves the IPv4 address;
requesting, by the TNAN network element, the P-GW to re-allocate an IPv4 address for the UE; and
sending, by the TNAN network element, the re-allocated IPv4 address to the UE.

7. The method according to claim 1, wherein,
when the IP address request message is a routing request message, the TNAN network element determines that the PDN type requested by the UE is IPv6; and
when the IP address request message is a DHCP discovery message, the TNAN network element determines that the PDN type requested by the UE is IPv4.

8. The method according to claim 1, further comprising: after the TNAN network element receives the IP address request message from the UE, returning, by the TNAN network element, a failure indication to the UE if the PDN type requested by the UE is not the PDN type subscribed by the UE.

9. The method according to claim 1, wherein, the TNAN network element is an access controller (AC) or a broadband network gateway (BNG).

10. The method according to claim 1, further comprising:
storing, by the TNAN network element, one or more IP addresses allocated by the P-GW for the UE in a session establishment procedure.

11. A trusted non-3GPP access network (TNAN) network element device, comprising a processor and a storage device, wherein the storage device stores processor-executable programs with the following units: an address obtaining unit and an address allocation unit, wherein,
the address obtaining unit is configured to: after receiving an extensible authentication protocol (EAP) authentication success message or an EAP authentication success triggering message, establish a session with a packet data network gateway (P-GW) of a mobile network, obtain and store one or more IP addresses allocated by the P-GW; and
the address allocation unit is configured to: after receiving an IP address request message from a user equipment (UE), send the UE an IP address which is allocated by the P-GW and is consistent with a packet data network (PDN) type requested by the UE in the IP address request message.

12. The TNAN network element device according to claim 11, wherein, the address obtaining unit is configured to establish the session with the P-GW based on a GPRS Tunnel Protocol (GTP) or a Proxy Mobile Internet Protocol (PMIP).

13. The TNAN network element device according to claim 12, wherein, the address obtaining unit is further configured to establish the session with the P-GW by a following modes:
obtaining the PDN types subscribed by the UE from an EAP authentication message during an EAP access authentication procedure of the UE;
establishing the session with the P-GW for all the PDN types subscribed by the UE, and carrying all the PDN types subscribed by the UE when sending a session establishment request or a proxy bearer update message to the P-GW; or, establishing one session with the P-GW for one PDN type according to the PDN types subscribed by the UE, and carrying one PDN type subscribed by the UE each time when sending a session establishment request or a proxy bearer update message to the P-GW in each session;
wherein, the one or more PDN types subscribed by the UE are IPv4 and/or IPv6.

14. The TNAN network element device according to claim 13, wherein,
the address obtaining unit is further configured to: when an IP address allocated by the P-GW for the UE is IPv4 address, receive a session establishment response sent by the P-GW in a session establishment procedure, and store at least the IPv4 address and an IPv4 timer carried in the session establishment response; and
the address allocation unit is further configured to: if the IPv4 timer times out and the IP address request message that the UE requests the IPv4 address has not been received yet, then indicate the P-GW to retrieve the IPv4 address.

15. The TNAN network element device according to claim 14, wherein, the address allocation unit is further configured to indicate the P-GW to retrieve the IPv4 address through a bearer update message or a session deleting message or a proxy bearer update message.

16. The TNAN network element device according to claim 15, wherein, the address allocation unit is further configured to: if a Dynamic Host Configuration Protocol (DHCP) discovery message of the UE is received after the P-GW retrieves the IPv4 address, then request the P-GW to re-allocate an IPv4 address for the UE, and send the re-allocated IPv4 address to the UE.

17. The TNAN network element device according to claim 11, wherein, the address allocation unit is further configured to: when the IP address request message is a routing request message, determine that the PDN type requested by the UE is IPv6; and when the IP address request message is a DHCP discovery message, determine that the PDN type requested by the UE is IPv4.

18. The TNAN network element device according to claim 11, wherein, the address allocation unit is further configured to: after the IP address request message from the UE is received, return a failure indication to the UE if the PDN type requested by the UE is not the PDN type subscribed by the UE.

19. The TNAN network element device according to claim 11, wherein, the TNAN network element is an access controller (AC) or a broadband network gateway (BNG).

20. The TNAN network element device according to claim 11, wherein, the address obtaining unit is further configured to store one or more IP addresses allocated by the P-GW for the UE in a session establishment procedure.

* * * * *